United States Patent
Suzuki

(10) Patent No.: US 8,265,192 B2
(45) Date of Patent: Sep. 11, 2012

(54) MULTILEVEL QAM DEMODULATOR, MULTILEVEL QAM DEMODULATION METHOD, AND WIRELESS COMMUNICATION SYSTEM

(75) Inventor: Yuuzou Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 785 days.

(21) Appl. No.: 12/328,886

(22) Filed: Dec. 5, 2008

(65) Prior Publication Data

US 2009/0154590 A1  Jun. 18, 2009

(30) Foreign Application Priority Data

Dec. 12, 2007  (JP) .................................. 2007-320897

(51) Int. Cl.
*H04L 25/34* (2006.01)
(52) U.S. Cl. ........ 375/286; 375/316; 375/324; 375/340; 375/327; 375/344; 375/338; 375/339; 329/304; 329/306; 329/307; 329/308
(58) Field of Classification Search .................. 375/286, 375/316, 324, 340, 327, 344, 338, 339; 329/304, 329/306, 307, 308
See application file for complete search history.

(56) References Cited

U.S. PATENT DOCUMENTS

| | | | | |
|---|---|---|---|---|
| 5,315,618 A | * | 5/1994 | Yoshida | 375/340 |
| 5,497,400 A | * | 3/1996 | Carson et al. | 375/324 |
| 6,038,267 A | * | 3/2000 | Oura et al. | 375/329 |
| 6,363,124 B1 | * | 3/2002 | Cochran | 375/326 |
| 7,899,340 B1 | * | 3/2011 | Bontu et al. | 398/209 |
| 2003/0026358 A1 | * | 2/2003 | Kawai | 375/324 |
| 2004/0184522 A1 | * | 9/2004 | Kravtsov | 375/233 |
| 2007/0087771 A1 | * | 4/2007 | Noble et al. | 455/522 |

FOREIGN PATENT DOCUMENTS

| | | |
|---|---|---|
| JP | 05-041662 | 2/1993 |
| JP | 2000-138722 | 5/2000 |
| JP | 2002-158724 | 5/2002 |
| JP | 2002-217992 | 8/2002 |
| JP | 2002-305558 | 10/2002 |
| JP | 2003-018230 | 1/2003 |
| JP | 2006-237819 | 9/2006 |
| JP | 2007-028160 | 2/2007 |

OTHER PUBLICATIONS

WO 2007/046427, Cross polarization interference compensation method, and cross polarization interference compensation device, published on Apr. 26, 2007 by Kawai, Masahiro, NEC Corporation.*

(Continued)

*Primary Examiner* — Siu Lee
(74) *Attorney, Agent, or Firm* — Young & Thompson

(57) ABSTRACT

A multilevel QAM demodulator includes a phase difference calculation unit calculating a phase difference signal based on the common phase signal and orthogonal signal after the phase rotation compensation, a phase shift amount calculation unit calculating a phase shift amount indicating a degree of a phase shift based on the common phase signal and orthogonal signal after the phase rotation compensation and phase noise compensation, and a correction unit correcting the phase difference signal based on the phase shift amount. A phase rotation is performed for the phase noise compensation based on the phase difference signal corrected by the correction unit.

9 Claims, 8 Drawing Sheets

OTHER PUBLICATIONS

Zhao, Liang et al., A Novel Adaptive Phase Noise Compensation Scheme for Communication Receivers, Global Telecommunications Conference, 2003, GLOBECOM '03, Dec. 5, 2003, vol. 4, pp. 2274-2279.

Official Action issued Jan. 24, 2012 by the Japanese Patent Office in counterpart Japanese Patent Application No. 2007-320897, 2 pages.
Non-Final Official Action issued by the Japanese Patent Office on Apr. 13, 2012 in counterpart Japanese Patent Application No. 2007-320897, w/English translation, 3 pages.

* cited by examiner

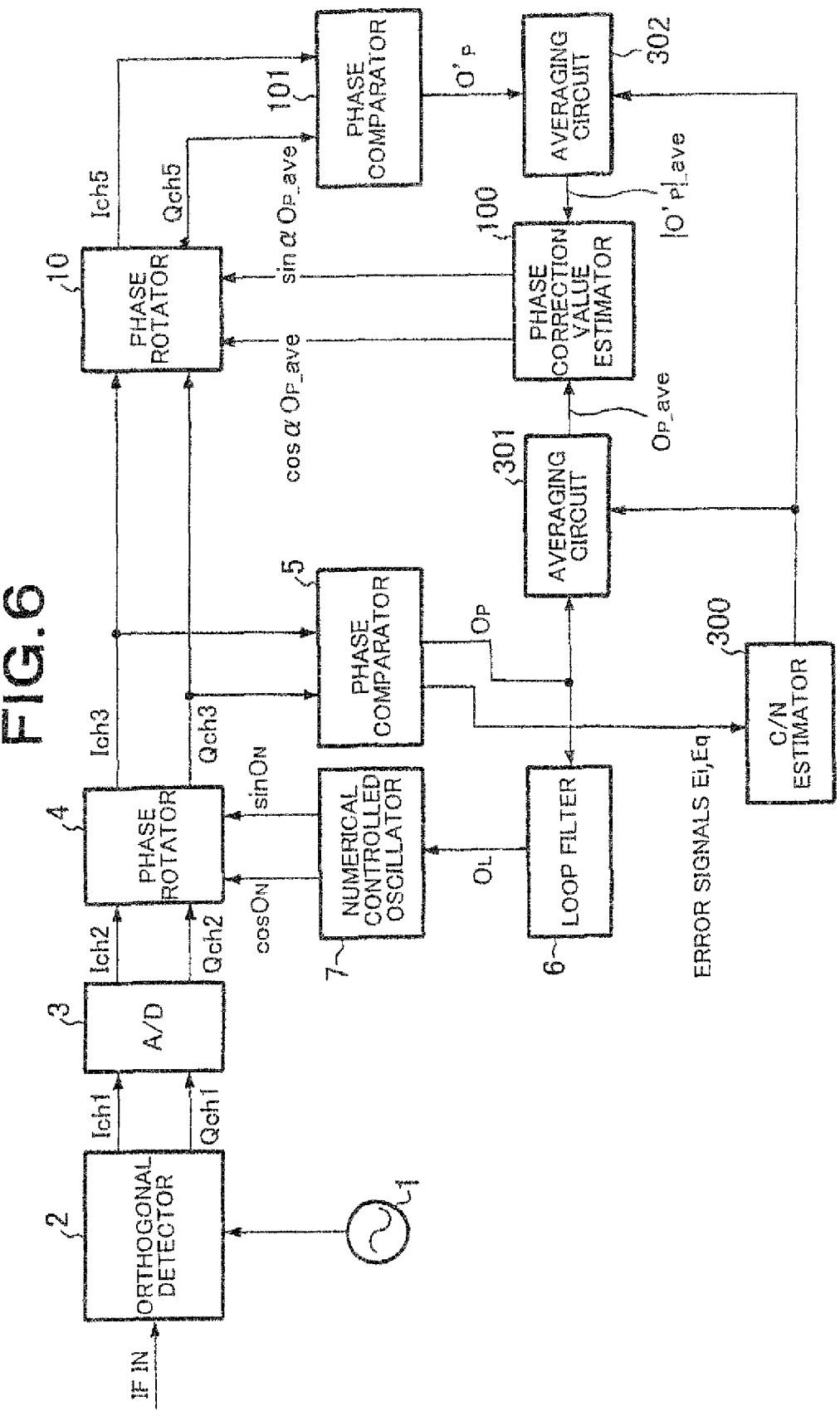

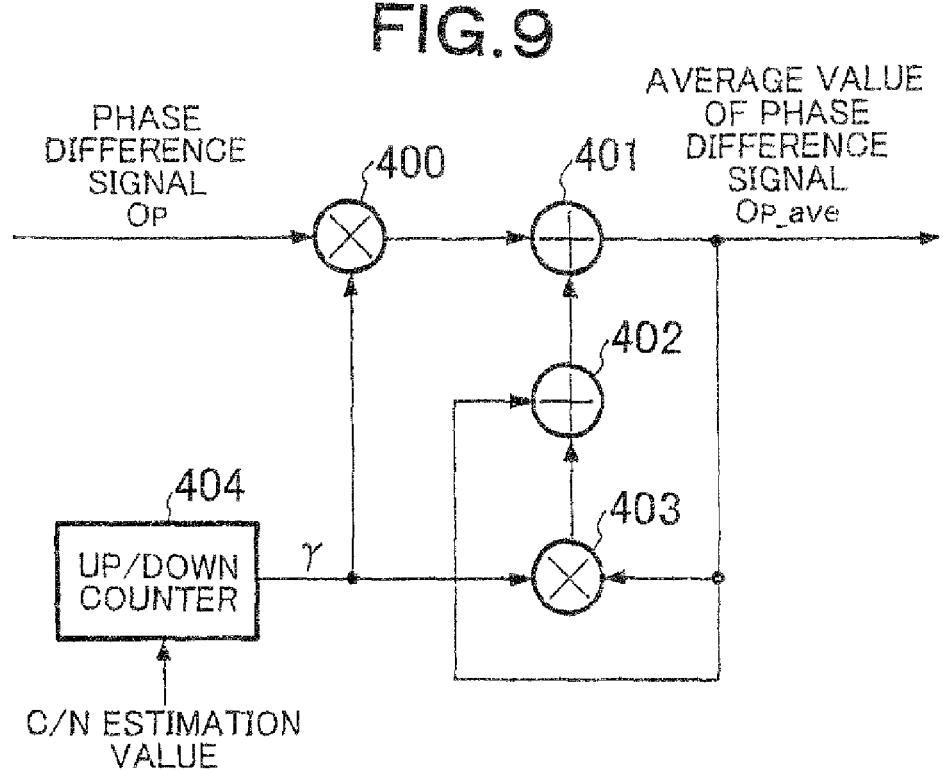
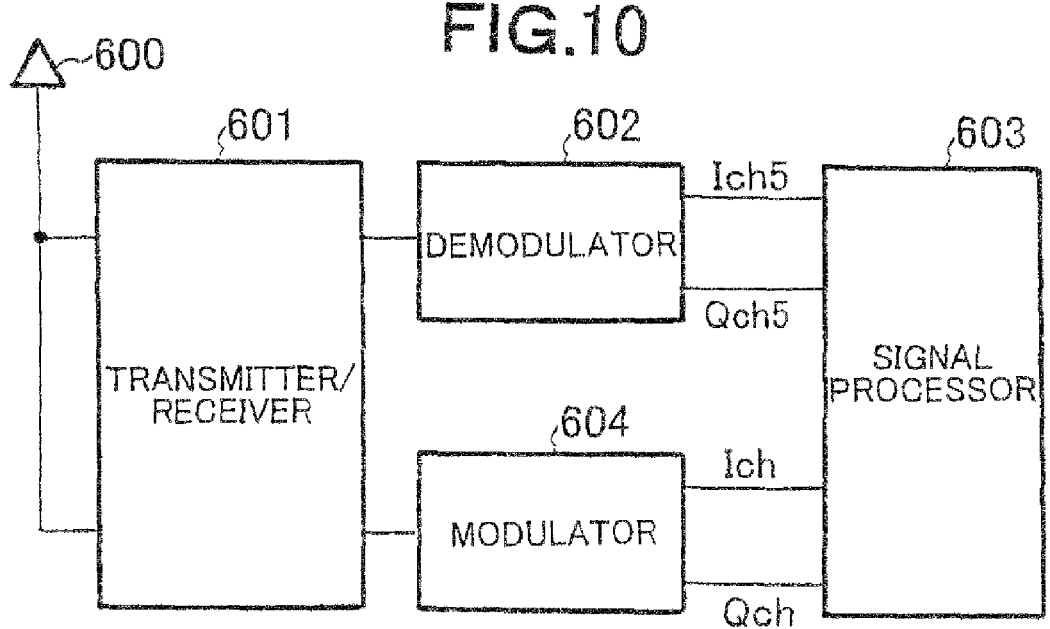

MULTILEVEL QAM DEMODULATOR, MULTILEVEL QAM DEMODULATION METHOD, AND WIRELESS COMMUNICATION SYSTEM

INCORPORATION BY REFERENCE

This application is based upon and claims the benefit of priority from Japanese Patent Application No. 2007-320897 filed on Dec. 12, 2007, the disclosure of which is incorporated herein in its entirety by reference.

BACKGROUND OF THE INVENTION

1. Field of the Invention

The present invention relates to a multilevel (multivalued) QAM demodulator, a multilevel QAM demodulation method, and a wireless communication system. More specifically, the present invention relates to a multilevel QAM demodulator performing a phase rotation compensation and a phase noise compensation on a common phase signal and an orthogonal signal which are obtained by quasi-synchronous detection, a demodulation method therefore, and a wireless communication system.

2. Description of the Related Art

Measures against phase noise have been taken in a demodulation circuit of a digital wireless communication system. The phase noise is generated mainly by a local oscillator employed when a frequency band of a modulation signal is converted from an intermediate frequency (IF) band into a radio frequency (RF) band or from the RF band into the IF band. The phase noise constitutes one factor for deterioration in transmission characteristic of wireless communication.

FIG. 1 is a block diagram of a demodulator, which relates to a related art of the present invention and which compensates for phase noise. As shown in FIG. 1, the demodulator is configured to include an oscillator 1, an orthogonal detector 2, an analog/digital converter (hereinafter, "A/D") 3, a phase comparator 5, a loop filter 6, a numerical controlled oscillator (hereinafter, "NCO") 7, an averaging circuit 8, a phase correction value estimator 9, and two phase rotators 4 and 10. In the following description, an input signal will be described as a multilevel quadrature amplitude modulation (multilevel QAM) signal and a detection method for the demodulator will be described as quasi-synchronous detection. Furthermore, orthogonal baseband components (a common phase signal and an orthogonal signal) are expressed by normal notation of "Ich" and "Qch", respectively.

An IF band signal (IF IN) influenced by phase noise is input to the orthogonal detector 2 performing quasi-synchronous detection of the multilevel QAM demodulator. The input signal (IF IN) is converted into analog signals (Ich1, Qch1) by using an output from the local oscillator 1 having substantially the same frequency as that of a carrier. The A/D 3 converts the analog signals (Ich1, Qch1) into digital signals (Ich2, Qch2). In this case, the digital signals (Ich2, Qch2) are influenced by not only a deterioration caused by the phase noise but also phase rotation resulting from a frequency difference between a local frequency output from the oscillator 1 and an IF frequency (a frequency of the input signal (IF IN)).

Compensation for the phase rotation and that for the phase noise will now be described in this order.

The compensation for the phase rotation is executed by a phase rotation compensating circuit. The phase rotation compensating circuit is constituted by a carrier loop controller (carrier PLL controller) configured to include the phase rotator 4, the phase comparator 5, the loop filter 6, and the NCO 7.

The phase rotator 4 complex-multiplies the digital signals (Ich2, Qch2) by phase control signals (cos $O_N$, sin $O_N$) output from the NCO 7, thereby converging the phase rotation. The phase comparator 5 makes a symbol determination with respect to signals (Ich3, Qch3) obtained from the phase rotator 4 to obtain signal determination values (Ich4, Qch4), and calculates polarity signals (Di, Dq) defined by positive or negative signs of the signals (Ich4, Qch4) and error signals (Ei, Eq) defined by a difference between the signals (Ich3, Qch3) and the signals (Ich4, Qch4). The phase comparator 5 also calculates a phase difference signal Op (Op=Dq·Ei−Di·Eq) from the polarity signals (Di, Dq) and the error signals (Ei, Eq) and outputs the phase difference signal Op to the loop filter 6. A polarity of the phase difference signal Op indicates lead or delay of a phase and an absolute value of the phase difference signal Op indicates degree of the lead or delay of the phase. The loop filter 6 smoothes the phase difference signal Op and outputs a signal $O_L$ corresponding to a carrier frequency difference. The NCO 7 accumulates the signal $O_L$, converts the accumulated signal $O_L$ into a value $O_N$ corresponding to an angle, and outputs values of a sine wave and a cosine wave (cos $O_N$, sin $O_N$) corresponding to the angle to the phase rotator 4 as a first phase control signal.

The compensation for the phase noise will next be described. If the carrier PLL controller cannot follow up to the phase shift and a carrier phase shift occurs due to the influence of the phase noise, this phase shift can be detected by the phase difference signal Op. However, the phase difference signal Op is often unable to appropriately indicate a direction of the phase shift due to the influence of heat noise. Due to this, the averaging circuit 8 is used to average the phase difference signal Op to suppress the influence of the heat noise. The averaging circuit 8, the phase correction value estimator 9, and the phase rotator 10 shown in FIG. 1 constitute a phase noise compensating circuit.

The phase correction value estimator 9 multiplies an average value (Op_ave) of the phase difference signal output from the averaging circuit 8 by a required gain α (hereinafter, "correction coefficient"), thereby associating the phase difference signal with a phase rotational angle. Thereafter, values of a sine wave and a cosine wave (cos α·Op_ave, sin α·Op_ave) corresponding to angle information (hereinafter, "phase correction value") denoted by "α·Op_ave" are output as a second phase control signal. The phase rotator 10 multiplies the signals (Ich3, Qch3) by the values (cos α·Op_ave, sin α·Op_ave), thereby returning a carrier phase shift. In this way, the carrier phase shift is corrected in a subsequent stage of the carrier PLL controller on the basis of a phase shift amount estimated from the phase difference signal Op, thereby realizing compensation for the phase noise that cannot be corrected simply by the carrier PLL controller.

As a related technique of the modulator related to the present invention, there is disclosed a carrier wave reproducing loop configured to include a complex multiplier, a phase error detector, an averaging circuit, an LPF, and an NCO in Japanese Patent Application Laid-Open (JP-A) No. 2000-138722 (paragraph [0060], FIG. 2). There is also disclosed C/N detection means included in a demodulator in JP-A No. 2002-158724 (FIG. 1). There are also disclosed carrier reproducing means and phase noise correction means in JP-A No. 2003-018230 (FIGS. 5, and 12). The carrier reproducing means includes a complex multiplier, a phase comparator, a loop filter, a numerically controlled oscillator (NCO), and a sin θ and cos θ generator.

Meanwhile, an optimum value is present for the correction coefficient α associating the average value (Op_ave) of the phase difference signal with the phase corrected value (α·Op_ave). With the configuration shown in FIG. 1, it is required to consider the optimum value in advance since the correction coefficient α is a set value.

Furthermore, the correction coefficient α depends on phase noise characteristics and the phase noise characteristics depend on performance of the oscillator. With the configuration shown in FIG. 1, therefore, it is required to adjust an appropriate value of the correction coefficient α on the basis of the performance of the oscillator. Particularly if the oscillator is changed to another oscillator to follow a change in a utilization frequency of the RF band, it is required to reconsider the optimum value for the correction coefficient α. It takes lots of time and labor to perform reconsideration operation.

SUMMARY OF THE INVENTION

An exemplary object of the present invention is to realize phase shift correction without being conscious of phase noise characteristics based on an oscillator.

According to a first exemplary aspect of the present invention, there is provided a multilevel (multivalued) QAM demodulator performing a phase rotation compensation and a phase noise compensation on a common phase signal and an orthogonal signal obtained by quasi-synchronous detection, the multilevel QAM demodulator including:

a phase difference calculator calculating a phase difference signal based on the common phase signal and orthogonal signal after the phase rotation compensation;

a phase shift amount calculator calculating a phase shift amount indicating a degree of a phase shift based on the common phase signal and orthogonal signal after the phase rotation compensation and phase noise compensation; and a correction unit correcting the phase difference signal based on the phase shift amount, wherein a phase rotation is performed for the phase noise compensation based on the phase difference signal corrected by the correction unit.

According to a second exemplary aspect of the present invention, there is provided a multilevel QAM demodulator including:

an oscillator;

an orthogonal detector converting an input signal into a common phase signal and an orthogonal signal by using an output from the oscillator;

a phase rotation compensating circuit compensating for a phase rotation of the common phase signal and orthogonal signal; and a phase noise compensating circuit compensating for a phase noise of a common phase signal and an orthogonal signal which are output from the phase rotation compensating circuit, wherein the phase rotation compensating circuit includes a first phase rotator rotating a phase of each of the common phase signal and orthogonal signal converted by the orthogonal detector, on the basis of a first phase control signal; and a first phase difference calculator calculating a first phase difference signal based on a common phase signal and an orthogonal signal which are output from the first phase rotator, the first phase difference signal being used to obtain the first phase control signal, and the phase noise compensating circuit includes a second phase rotator rotating a phase of each of the common phase signal and orthogonal signal output from the first phase rotator on the basis of a second phase control signal;

a second phase difference calculator calculating a second phase difference signal based on a common phase signal and an orthogonal signal which are output from the second phase rotator;

a first averaging unit averaging the first phase difference signal, and outputting a first average value;

a second averaging unit averaging an absolute value of the second phase difference signal, and outputting a second average value; and a phase controller outputting the second phase control signal according to angle information obtained by multiplying the first average value by a correction value calculated using the second average value.

According to a third exemplary aspect of the present invention, there is provided a demodulation method of a multilevel QAM demodulator performing a phase rotation compensation and a phase noise compensation on a common phase signal and an orthogonal signal which are obtained by quasi-synchronous detection, the demodulation method including:

calculating a phase difference signal based on the common phase signal and orthogonal signal after the phase rotation compensation;

calculating a phase shift amount indicating a degree of a phase shift based on the common phase signal and orthogonal signal after the phase noise compensation;

correcting the phase difference signal based on the phase shift amount; and performing a phase rotation for the phase noise compensation based on the corrected phase difference signal.

According to a fourth exemplary aspect of the present invention, there is provided A demodulation method of a multilevel QAM demodulator including an oscillator; an orthogonal detector converting an input signal into a common phase signal and an orthogonal signal by using an output from the oscillator; a phase rotation compensating circuit compensating for a phase rotation of the common phase signal and orthogonal signal; and a phase noise compensating circuit compensating for a phase noise of a common phase signal and an orthogonal signal which are output from the phase rotation compensating circuit, the demodulation method including:

performing, by the phase rotation compensating circuit, to rotate a phase of each of the common phase signal and orthogonal signal converted by the orthogonal detector, on the basis of a first phase control signal, to calculate a first phase difference signal based on the phase-rotated common phase signal and the phase-rotated orthogonal signal, and to obtain the first phase control signal by using the first phase difference signal;

performing, by the phase noise compensating circuit, to rotate a phase of each of the common phase signal and orthogonal signal output from the phase rotation compensating circuit on the basis of a second phase control signal, to calculate a second phase difference signal based on the phase-rotated common phase signal and the phase-rotated orthogonal signal, to average the first phase difference signal and output a first average value, to average the second phase difference signal and output a second average signal, and to obtain the second phase control signal according to angle information obtained by multiplying the first average value by a correction value calculated using the second average value.

BRIEF DESCRIPTION OF THE DRAWINGS

FIG. 6 is a block diagram showing a configuration of a demodulator according to a second example of the present invention;

FIG. 9 is a block diagram showing an example of a configuration of an averaging circuit 301 used in the second example; and FIG. 10 is a block diagram showing a configuration of a wireless communication system according to a third example of the present invention.

DETAILED DESCRIPTION OF THE INVENTION

An exemplary embodiment and exemplary examples of the present invention will be described hereinafter in detail with reference to the accompanying drawings.

EXEMPLARY EMBODIMENT

Figure 2:
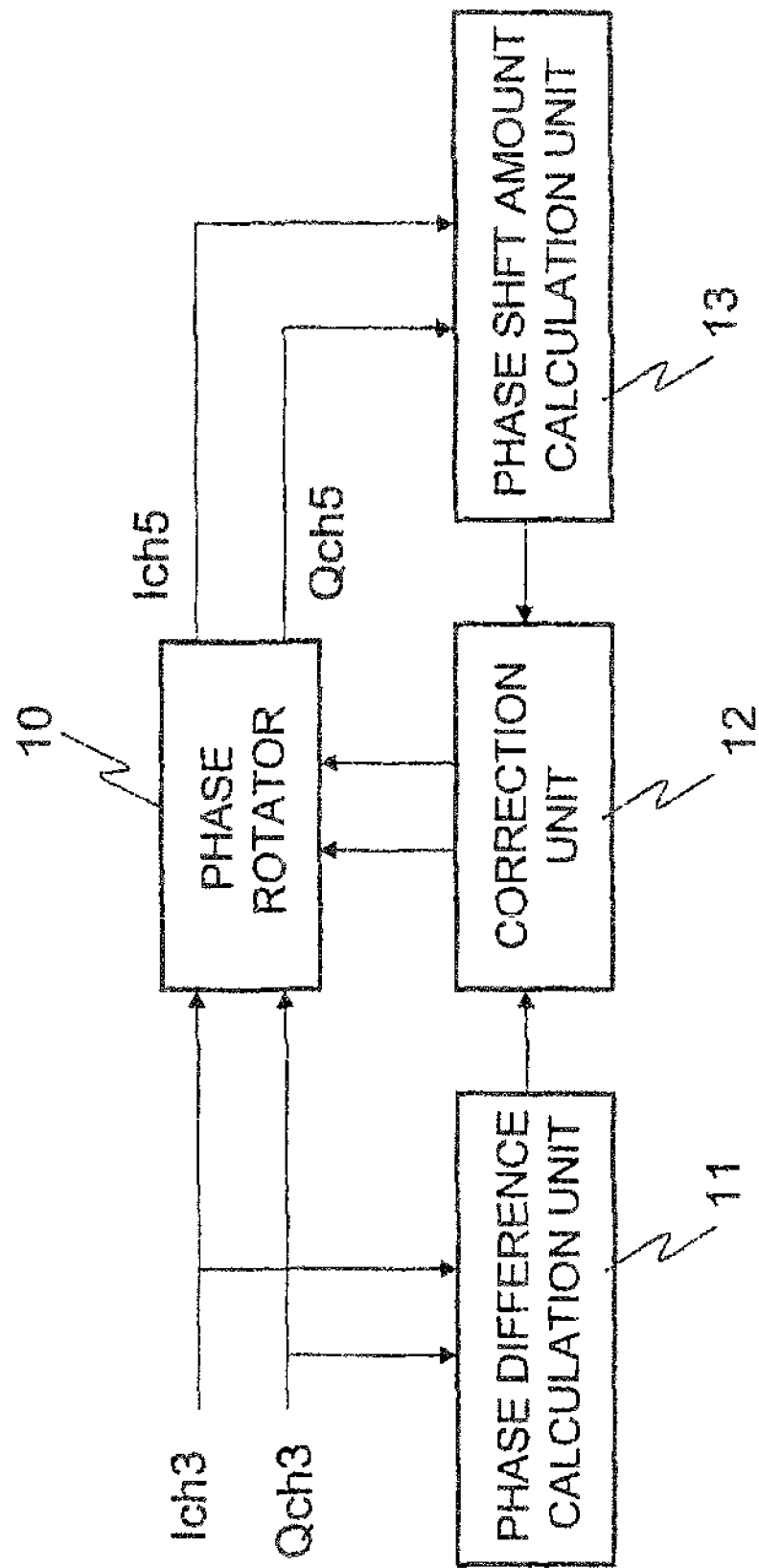
FIG. 2 is a block diagram showing a configuration of a demodulator according to an exemplary embodiment of the present invention.

FIG. 2 is a block diagram showing a configuration of a demodulator according to an exemplary embodiment of the present invention. The demodulator shown in FIG. 2 includes a second phase rotator 10, a phase difference calculation unit 11, a correction unit 12, a phase shift amount calculation unit 13.

The phase difference calculation unit 11 calculates a phase difference signal based on a common phase signal Ich3 and an orthogonal signal Qcb3 after a phase rotation compensation. The phase shift amount calculation unit 13 calculates a phase shift amount indicating a degree of a phase shift based on a common phase signal Ich5 and an orthogonal signal Qch5 after a phase noise compensation. The correction unit 12 corrects the phase difference signal based on the phase shift amount. The second phase rotator 10 performs a phase rotation for the phase noise compensation to the common phase signal Ich3 and orthogonal signal Qch3, on the basis of the phase difference signal corrected by the correction unit 12.

Figure 1:
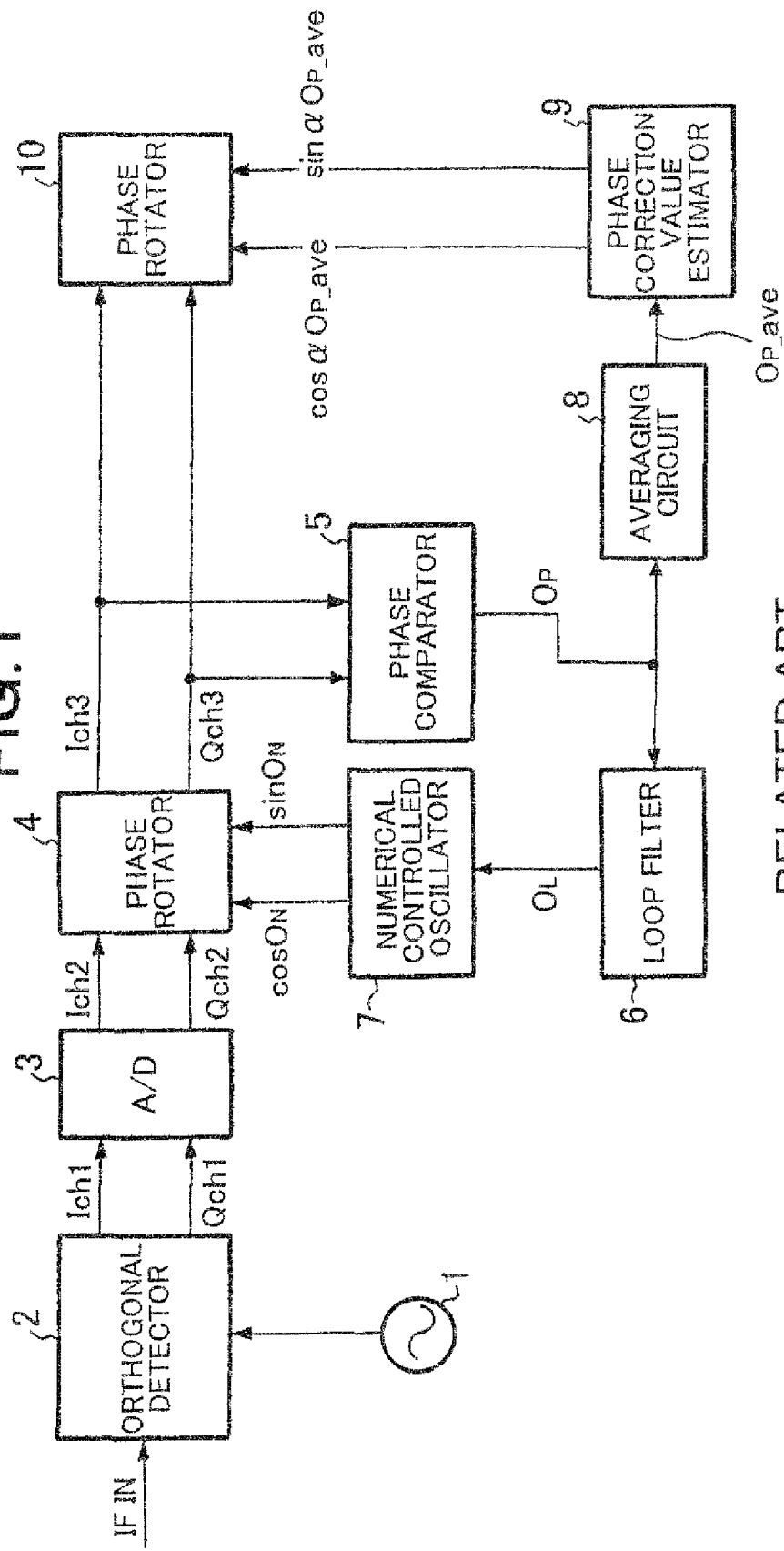
FIG. 1 is a block diagram of a demodulator compensating for phase noise according to a related art of the present invention.

In the demodulator shown in FIG. 1, the phase difference signal averaged by the averaging circuit 8 is input to the phase correction value estimator 9. The phase comparator 5 and averaging circuit 8 serve as a phase difference calculation unit and the phase correction value estimator 9 serves as a correction unit. Correction by the phase correction value estimator 9 depends on phase noise characteristics and the phase noise characteristics depend on performance of a local oscillator used in frequency conversion. On the other hand, in the embodiment, the demodulator includes the phase shift amount calculation unit 13, the correction unit 12 corrects the phase difference signal based on the phase shift amount output from the phase shift amount calculation unit 13, and the second phase rotator 10 performs a phase rotation based on the phase difference signal corrected by the correction unit 12.

The demodulator according to the embodiment can, therefore, advantageously make appropriate phase noise compensation without being conscious of difference of phase noise characteristics inherent in the oscillator.

Next, exemplary examples using the demodulator of the embodiment will be described hereinafter in detail with reference to the accompanying drawings

First Example

Figure 3:
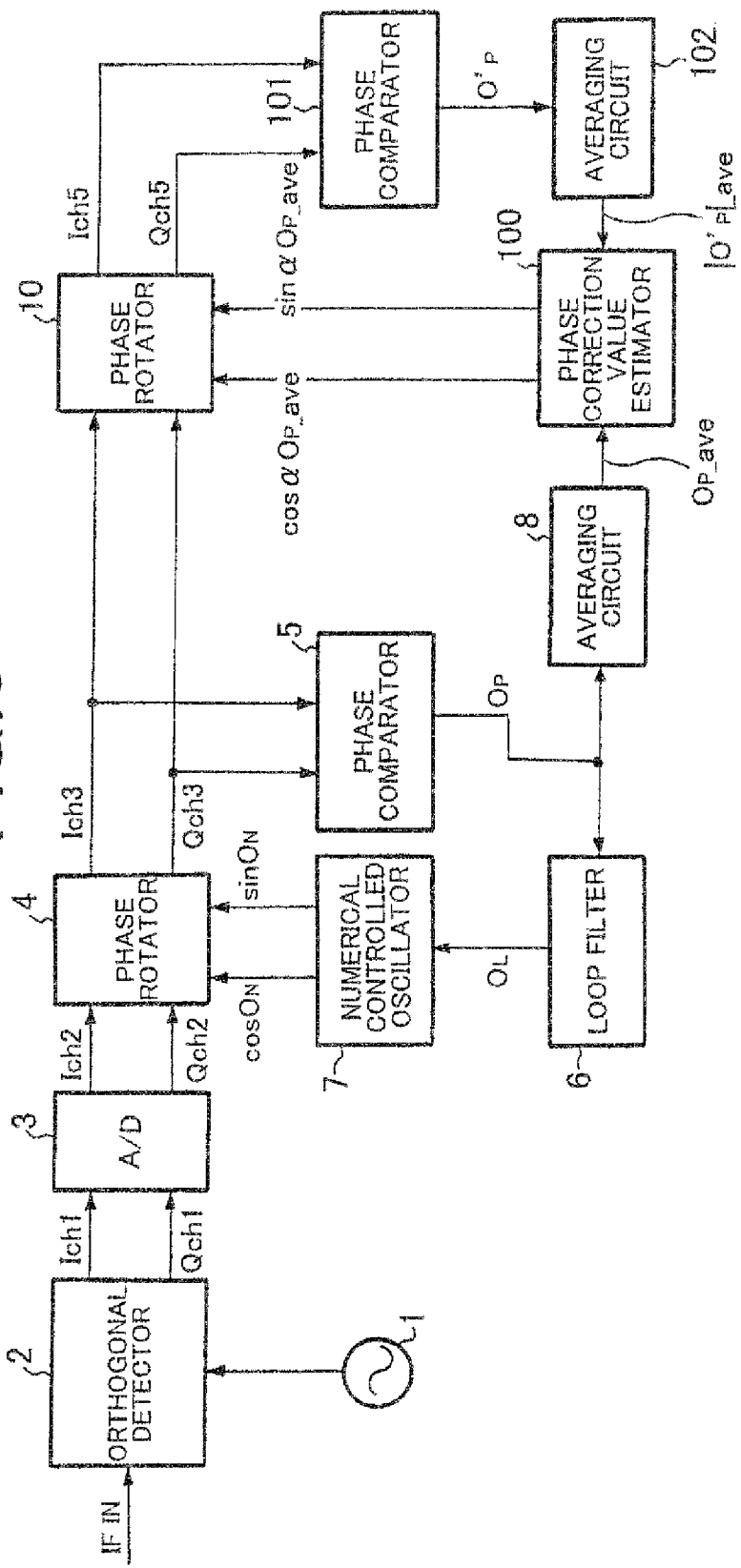
FIG. 3 is a block diagram showing a configuration of a demodulator according to a first example of the present invention.
Figure 4:
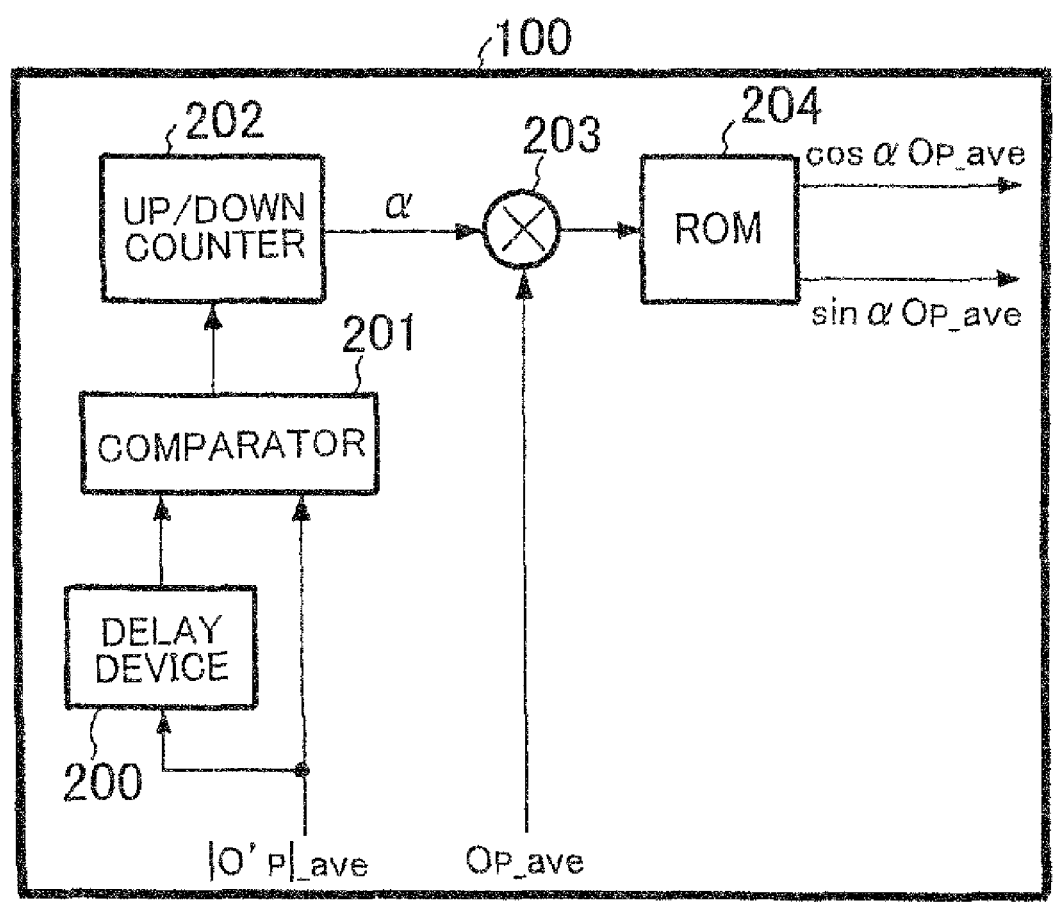
FIG. 4 is a block diagram showing an internal configuration of a phase correction value estimator 100.

FIG. 3 is a block diagram showing a configuration of a demodulator according to a first example of the present invention. The demodulator shown in FIG. 3 is configured to include a phase comparator 101 and an averaging circuit 102 besides the constituent elements of the demodulator shown in FIG. 1 and to replace the phase correction value estimator 9 shown in FIG. 1 by a phase correction value estimator 100. FIG. 4 shows an internal configuration of the phase correction value estimator 100. In FIG. 3, the same constituent elements as those shown in FIG. 1 are denoted by the same reference symbols and will not be described herein.

A phase noise compensating circuit according to the first example includes the averaging circuit 8 serving as a first averaging unit, the phase correction value estimator 100 serving as a phase controller, a phase rotator 10 serving as a second phase rotator, the phase comparator 101 serving as a second phase difference calculator, and the averaging circuit 102 serving as a second averaging unit. A phase rotation compensating circuit according to the first example includes the phase rotator 4 serving as a first phase rotator, a phase comparator 5 serving as a first phase difference calculator, a loop filter 6, and a NCO 7. The phase correction value estimator 100 corresponds to the correction unit 12 of FIG. 2, the phase comparator 5 and averaging circuit 8 corresponds to the phase difference calculation unit 11 of FIG. 2, and the phase comparator 101 and averaging circuit 102 corresponds to the phase shift amount calculation unit 13 of FIG. 2.

The constituent elements of the demodulator according to the first example different from those shown in FIG. 1 will be described.

The phase comparator 101 calculates a phase difference signal O'p from signals (Ich5, Qch5) phase shift-corrected by the phase rotator 10. The averaging circuit 102 averages and outputs an absolute value |O'p| of this phase difference signal O'p. The absolute value |O'p| of the phase difference signal O'p will be referred to as "phase shift amount" since the absolute value |O'p| indicates degree of phase shift. An average phase difference signal Op_ave before phase shift correction and an average value |O'p|_ave of the phase shift amount obtained from the phase shift-corrected signal are input to the phase correction value estimator 100. The average phase difference signal Op_ave before phase shift correction is output from the averaging circuit 8 and the average value |O'p|_ave of the phase shift amount is output from the averaging circuit 102.

The internal configuration of the phase correction value estimator 100 will next be described with reference to FIG. 4. A delay device 200 is constituted by a shift register, delays the input average value |O'p|_ave by predetermined time, and outputs the delayed average value. A comparator 201 functions to compare a current average value |O'p|_ave with an average value |O'p|_ave input via the delay device 200, thereby monitoring an increase or a decrease of |O'p|_ave. The comparator 201 outputs a comparison result to an Up/Down counter 202.

The Up/Down counter 202 changes over an increase or a decrease of a counter value based on the comparison result output from the comparator 201. The counter value is output to a multiplier 203 as the correction coefficient α as it is. It is to be noted that an initial counter value is an initially set value of the correction coefficient α. The multiplier 203 multiplies the average phase difference signal Op_ave before correction by the correction coefficient α to associate the phase difference signal with angle information α·Op_ave. The multiplier 203 outputs the angle information α·Op_ave to a ROM 204. The ROM 204 outputs values of a sine wave and a cosine wave (cos(α·Op_ave), sin(α·Op_ave)) corresponding to the angle information α·Op_ave, as a second phase control signal. The phase rotator 10 corrects a carrier phase shift by multiplying the signals (Ich3, Qch3) by values (cos (α·Op_ave), sin(α·Op_ave)).

The delay device 200, the comparator 201, the Up/Down counter 202, and the multiplier 203 constitute a correction unit.

Figure 5A:
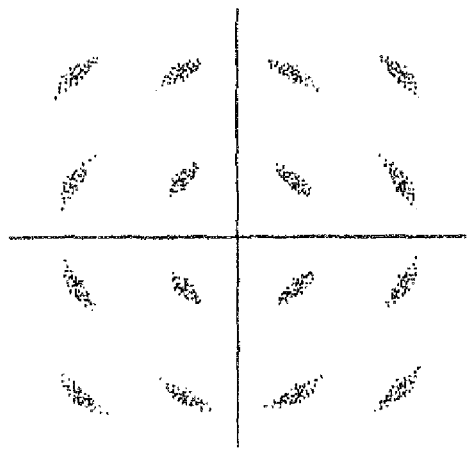
FIGS. 5A to 5D are diagrams showing examples of constellations of phase-corrected signals.

FIG. 5A shows a constellation right after start of operation performed by the demodulator according to the first example of the present invention. Signals on the constellation are phase-corrected by signals (Ich5, Qch5) output from the phase rotator 10 and modulation method is assumed as 16 QAM. Further, it is assumed that an initial value of the correction coefficient α is 0 and that the Up/Down counter 202 increases the counter value (correction coefficient α) right after being actuated. As shown in FIG. 5A, the phase correction is insufficient right after start of the operation and the phase-corrected signals fluctuate largely almost similarly to the signals before the phase correction.

Figure 5B:
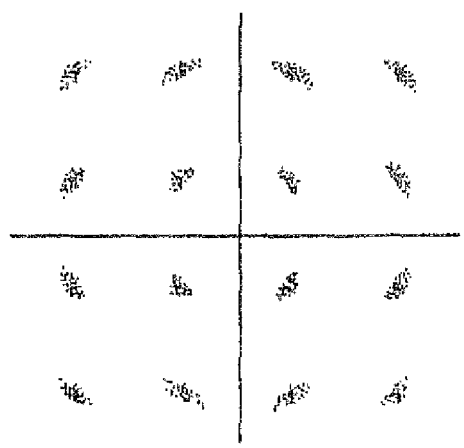

FIG. 5B shows a constellation when the phase correction is gradually executed to follow an increase of the correction coefficient α. As shown in FIG. 5B, although the influence of the phase shift is not completely removed, the signal fluctuation is suppressed as compared with a state shown in FIG. 5A. Therefore, the average phase shift amount |O'p|_ave of the corrected signal gradually decreases. At this time, the comparator 201 included in the phase correction value estimator 100 determines that an average value $|O'p|^{(n)}$_ave of a phase shift amount at a certain time (t=n) is smaller than an average value $|O'p|^{(n-k)}$_ave at a time (t=n·k) before the certain time, and outputs a determination result of $|O'p|^{(n)}$_ave<$|O'p|^{(n-k)}$_ave. The Up/Down counter 202 keeps a direction of the increase or decrease of the counter value as it is (the increase of the counter value) based on the determination result and controls the correction coefficient α in a direction of further increasing.

Figure 5C:
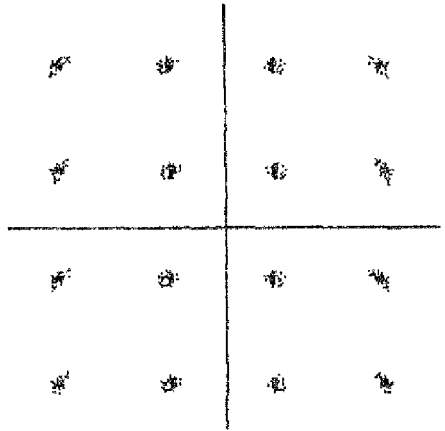

By increasing the correction coefficient α, the phase corrected value α·Op nears the optimum value while gradually rising. FIG. 5C shows a constellation when the phase corrected value α·Op reaches the optimum value. As shown in FIG. 5C, the phase noise is appropriately corrected and the constellation converges into a signal determination point.

Figure 5D:
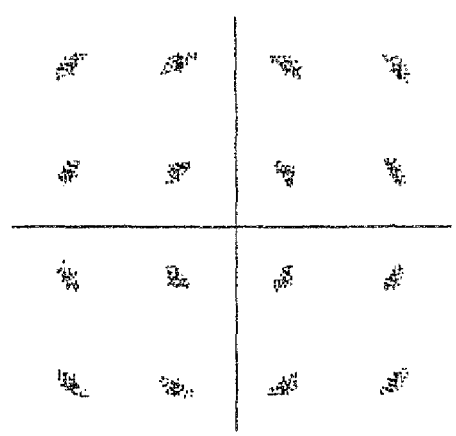

Thereafter, when the Up/Down counter 202 further increases the counter value and the correction coefficient α exceeds the optimum value, over-compensation occurs. FIG. 5D shows a constellation at the time of the over-compensation. As shown in FIG. 5D, because of setting the correction coefficient α to be unnecessarily high, the signals are influenced by the phase shift resulting from excessive phase correction. At this time, an average value |O'p|_ave of a phase shift amount obtained from the corrected signals diverges. Due to this, the comparator 201 determines that the average value $|O'p|^{(n)}$_ave of the phase shift amount at the certain time (t=n) is greater than the average value $|O'p|^{(n-k)}$_ave at the time (t=n·k) before the certain time, and outputs a determination result of $|O'p|^{(n)}$_ave>$|O'p|^{(n-k)}$_ave. The Up/Down counter 202 sets the direction of the increase or decrease of the counter value to be opposite to the present direction (the decrease of the counter value) based on the determination result and controls the correction coefficient α in a direction of decreasing. In this way, by repeatedly controlling the increase or decrease of the correction coefficient α in the direction of decreasing the average phase shift amount |O'p|_ave, based on a change rate of the average phase shift amount |O'p|_ave detected from the phase-corrected signal, the phase corrected value α·Op converges into the optimum value.

In the first example, the adaptive control over the phase correction coefficient α is added to the phase noise correction circuit shown in FIG. 1. The demodulator according to the first example can, therefore, advantageously make appropriate phase noise compensation without being conscious of difference of phase noise characteristics inherent in the oscillator. Moreover, according to the first example, there is no need to manually adjust the appropriate value of the correction coefficient α by pre-consideration and the influence of the phase noise can be completely eliminated digitally and automatically by adding the circuits. Furthermore, the demodulator can be constituted into LSI because of complete digitization.

Second Example

FIG. 6 is a block diagram showing a configuration of a demodulator according to a second example of the present invention. In FIG. 6, the same constituent elements as those shown in FIG. 3 according to the first example are denoted by the same reference symbols and will not be described herein, According to the second example, as shown in FIG. 6, the demodulator is configured to further include a C/N (carrier-to-noise ratio) estimator 300 besides the constituent elements according to the first example, and to replace the averaging circuits 8 and 102 by averaging circuits 301 and 302, respectively. The averaging circuits 301 and 302 are different from the averaging circuits 8 and 102 in functions. The C/N estimator 300 calculates a C/N estimation value from error signals (Ei, Eq) output from the phase comparator 5 and outputs the C/N estimation value. The error signals (Ei, Eq) are obtained by calculating a difference between signals (Ich3, Qch3) obtained from the phase rotator 4 and signal determination values (Ich4, Qch4) obtained by subjecting the signals (Ich3, Qch3) to a symbol determination. Each of the averaging circuits 301 and 302 controls a forgetting coefficient used when calculating an average value, based on this C/N estimation value.

Figure 7:
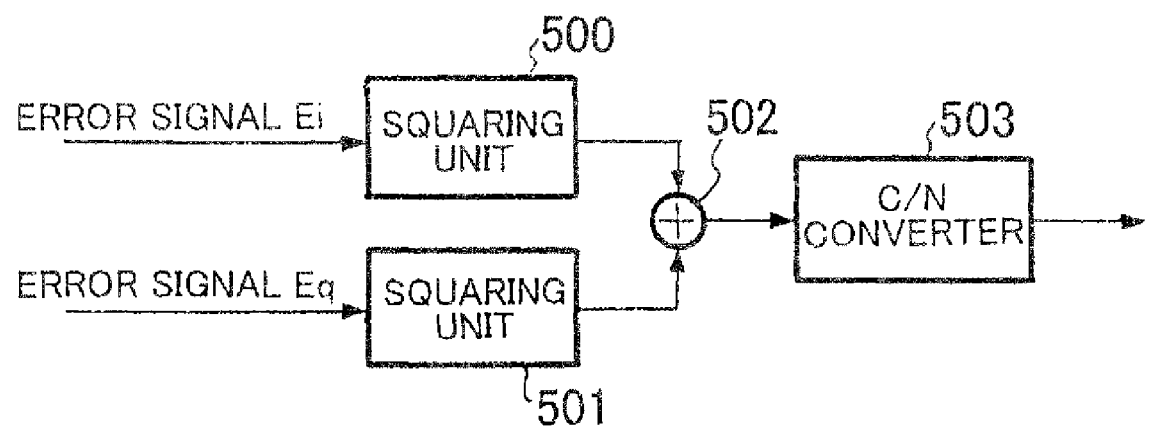
FIG. 7 is a block diagram showing a configuration of a C/N estimator.

FIG. 7 is a block diagram showing a configuration of the C/N estimator 300. As shown in FIG. 7, the C/N estimator 300 is configured to include squaring units 500 and 501, an adder 502, and a C/N converter 503.

The squaring units 500 and 501 square input error signals Ei and Eq, respectively. The adder 502 adds up square values of the error signals Ei and Eq obtained from the squaring units 500 and 501, respectively, and outputs the addition result as an instantaneous noise power estimation value. The C/N converter 503 divides an average signal power by the instantaneous noise power estimation value output from the adder 502, thereby converting the average signal power into a C/N estimation value.

The average signal power is given as a square mean value of symbol determination values (Pch4, Qch4). Since the symbol determination values (Pch4, Qch4) are known values uniquely determined by a modulation method, the average signal power is also a known value. Accordingly, the average signal power is preset as a fixed value.

Figure 8:
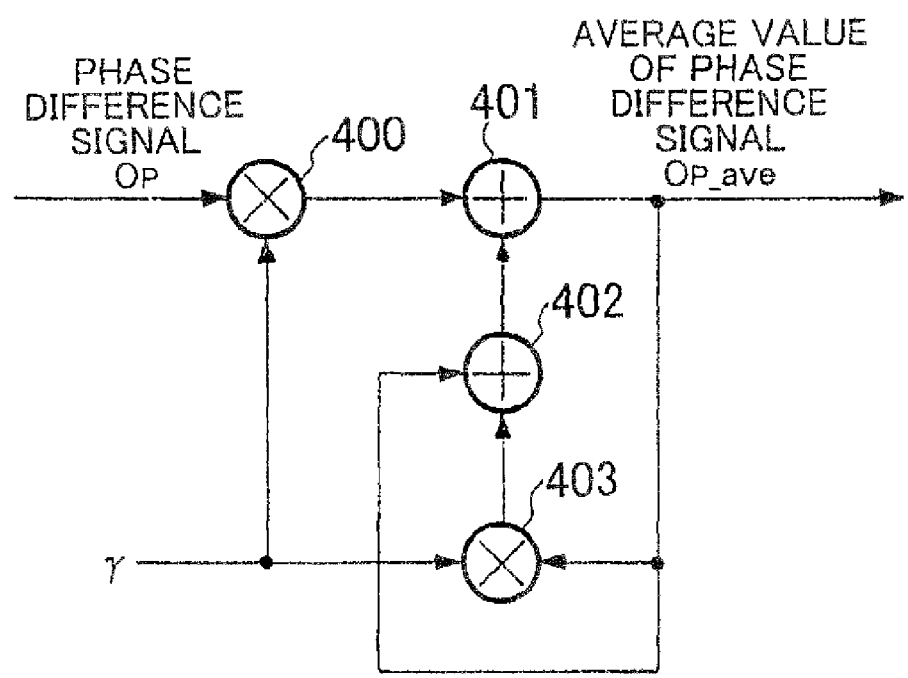
FIG. 8 is a block diagram showing an example of a configuration of an averaging circuit 8 used in the first example.

FIG. 8 is a block diagram showing an example of a configuration of the averaging circuit 8 used in the first example. As shown in FIG. 8, the averaging circuit 8 is configured to include two adders 401 and 402 and two multipliers 400 and 403. A forgetting coefficient γ is set to the averaging circuit 8 in advance. If the forgetting coefficient γ is set smaller, the apparent number of signals to be averaged is greater. By performing averaging, the influence of misdetection specific to phase difference signals resulting from random noise such as heat noise can be lessened and phase shift detection accuracy is improved. However, if the forgetting coefficient γ is set excessively small, a time constant used in the control is higher and the probability of missing a prompt movement of the phase noise is higher. Therefore, an optimum value is present for the forgetting coefficient γ.

While FIG. 8 shows the averaging circuit 8, the averaging circuit 102 further includes an absolute value conversion circuit in front of the constituent elements of the averaging circuit 8 shown in FIG. 8. The absolute value conversion circuit averages and outputs an absolute value of the phase difference signal.

FIG. 9 is a block diagram showing an example of a configuration of the averaging circuit 301 used in the second example. While FIG. 9 shows the averaging circuit 301, the averaging circuit 302 further includes an absolute value conversion circuit in front of the constituent elements of the averaging circuit 301 shown in FIG. 9. The absolute value conversion circuit averages and outputs an absolute value of the phase difference signal.

A calculated value of the Up/Down counter 404, that is, an increase or a decrease of the forgetting coefficient γ is controlled based on the C/N estimation value. In a region in which the C/N estimation value is low and the heat noise is dominant, the calculated value of the Up/Down counter 404 is decreased to set the forgetting coefficient γ smaller, thereby lessening the bad influence of the heat noise on the phase shift detection while sacrificing follow-up characteristic to the phase noise. In a region in which the C/N estimation value is high and the heat noise is almost negligible, the calculated value of the Up/Down counter 404 is increased to set the forgetting coefficient γ greater, thereby exercising a control to improve the follow-up characteristic to the phase noise. In this way, the averaging circuit 301 according to the second example can provide an optimum phase noise detection method according to a change of the C/N.

Third Example

In a third example of the present invention, a wireless communication system using the demodulator according to the first or second example described above will be described.

FIG. 10 is a block diagram showing a configuration of the wireless communication system according to the third example of the present invention. As shown in FIG. 10, the wireless communication system includes a transmitter/receiver 601 frequency-converting a reception signal received by a wireless communication device antenna 600 from an RF band to an IF band and outputting the frequency-converted signal, a demodulator 602 according to the first or second example to which the signal in the IF band influenced by phase noise is input, and a signal processor 603 processing baseband signals output from the demodulator 602 into a voice signal and a data signal. The baseband signals output from the signal processor 603 are output from the antenna 600 via a modulator 604 and the transmitter/receiver 601.

As stated so far, each of the demodulators according to the embodiment examples of the present invention are applicable to every digital wireless communication system such as a wireless base station or a portable terminal.

The present invention can be variously modified without departing from the spirit or claimed features thereof. It is therefore to be understood that the foregoing embodiment and examples are illustrative and not restrictive. The scope of the invention is defined by the scope of claims and is not limited by the description and the abstract. Further, all modifications and changes belonging to the equivalent scope of the scope of claims of the present invention are within the scope of the present invention.

What is claimed is:

1. A multilevel QAM demodulator performing a phase rotation compensation and a phase noise compensation on both a common phase signal and an orthogonal signal which are obtained by quasi-synchronous detection, the multilevel QAM demodulator comprising:
   a phase difference calculation unit calculating a phase difference signal based on the common phase signal and orthogonal signal after the phase rotation compensation;
   a phase shift amount calculation unit calculating a phase shift amount indicating a degree of a phase shift based on the common phase signal and orthogonal signal after the phase rotation compensation and phase noise compensation; and
   a correction unit correcting the phase difference signal based on the phase shift amount,
   wherein a phase rotation is performed for the phase noise compensation based on the phase difference signal corrected by the correction unit and the phase noise compensation is performed after the phase rotation compensation, and
   wherein the phase shift amount is an absolute value of a phase difference signal based on the common phase signal and orthogonal signal after the phase noise compensation.

2. A multilevel QAM demodulator comprising:
   an oscillator;
   an orthogonal detector converting an input signal into a common phase signal and an orthogonal signal by using an output from the oscillator;
   a phase rotation compensating circuit compensating for a phase rotation of the common phase signal and orthogonal signal; and
   a phase noise compensating circuit compensating for a phase noise of a common phase signal and an orthogonal signal which are output from the phase rotation compensating circuit,
   wherein the phase rotation compensating circuit includes
   a first phase rotator rotating a phase of each of the common phase signal and orthogonal signal converted by the orthogonal detector, on the basis of a first phase control signal; and
   a first phase difference calculator calculating a first phase difference signal based on a common phase signal and an orthogonal signal which are output from the first phase rotator, the first phase difference signal being used to obtain the first phase control signal, and
   the phase noise compensating circuit includes a second phase rotator rotating a phase of each of the common phase signal and orthogonal signal output from the first phase rotator, on the basis of a second phase control signal;

a second phase difference calculator calculating a second phase difference signal based on a common phase signal and an orthogonal signal which are output from the second phase rotator;

a first averaging unit averaging the first phase difference signal, and outputting a first average value;

a second averaging unit averaging an absolute value of the second phase difference signal, and outputting a second average value; and a phase controller outputting the second phase control signal according to angle information obtained by multiplying the first average value by a correction value calculated using the second average value.

3. The multilevel QAM demodulator according to claim 2, wherein the phase noise compensating circuit includes a carrier-to-noise ratio (C/N) estimator for calculating a C/N estimation value based on error signals defined by a difference between the common phase signal and the orthogonal signal output from the first phase rotator and signal determination values obtained by subjecting the common phase signal and the orthogonal signal output from the first phase rotator to a symbol determination, the error signals being output from the first phase difference calculator, and each of the first and second averaging units performs averaging by using a forgetting coefficient based on the C/N estimation value.

4. The multilevel QAM demodulator according to claim 2, wherein the phase controller includes a delay device for delaying an input second average value; and a comparator for comparing the input second average value with a delayed second average value, and detecting an increase or a decrease of the second average value, and wherein the correction value is set to correspond to the increase or the decrease of the second average value.

5. A wireless communication system using the multilevel QAM demodulator according to claim 2.

6. A demodulation method of a multilevel QAM demodulator performing a phase rotation compensation and a phase noise compensation on both a common phase signal and an orthogonal signal which are obtained by quasi-synchronous detection, the demodulation method comprising:

calculating a phase difference signal based on the common phase signal and orthogonal signal after the phase rotation compensation;

calculating a phase shift amount indicating a degree of a phase shift based on the common phase signal and orthogonal signal after the phase noise compensation;

correcting the phase difference signal based on the phase shift amount; and performing a phase rotation for the phase noise compensation based on the corrected phase difference signal, wherein the phase noise compensation is performed after the phase rotation compensation, and wherein the phase shift amount is an absolute value of a phase difference signal based on the common phase signal and orthogonal signal after the phase noise compensation.

7. A demodulation method of a multilevel QAM demodulator including an oscillator; an orthogonal detector converting an input signal into a common phase signal and an orthogonal signal by using an output from the oscillator; a phase rotation compensating circuit compensating for a phase rotation of the common phase signal and orthogonal signal; and a phase noise compensating circuit compensating for a phase noise of a common phase signal and an orthogonal signal which are output from the phase rotation compensating circuit, the demodulation method comprising:

performing, by the phase rotation compensating circuit, to rotate a phase of each of the common phase signal and orthogonal signal converted by the orthogonal detector, on the basis of a first phase control signal, to calculate a first phase difference signal based on the phase-rotated common phase signal and the phase-rotated orthogonal signal, and to obtain the first phase control signal by using the first phase difference signal;

performing, by the phase noise compensating circuit, to rotate a phase of each of the common phase signal and orthogonal signal output from the phase rotation compensating circuit on the basis of a second phase control signal, to calculate a second phase difference signal based on the phase-rotated common phase signal and the phase-rotated orthogonal signal, to average the first phase difference signal and output a first average value, to average the second phase difference signal and output a second average signal, and to obtain the second phase control signal according to angle information obtained by multiplying the first average value by a correction value calculated using the second average value.

8. The demodulation method according to claim 7, wherein the phase noise compensating circuit calculates a carrier-to-noise ratio (C/N) estimation value based on error signals defined by a difference between the common phase signal and orthogonal signal phase-rotated based on the first phase control signal and signal determination values obtained by subjecting the common phase signal and orthogonal signal phase-rotated based on the first phase control signal to a symbol determination, and each of the first and second average values is calculated by using a forgetting coefficient based on the C/N estimation value.

9. The demodulation method according to claim 7, wherein the phase noise compensating circuit perform to delay the second average value, to compare the second average value with a delayed second average value, to detect an increase or a decrease of the second average value, and to set the correction value to correspond to the increase or the decrease of the second average value.

* * * * *